Oct. 6, 1925.

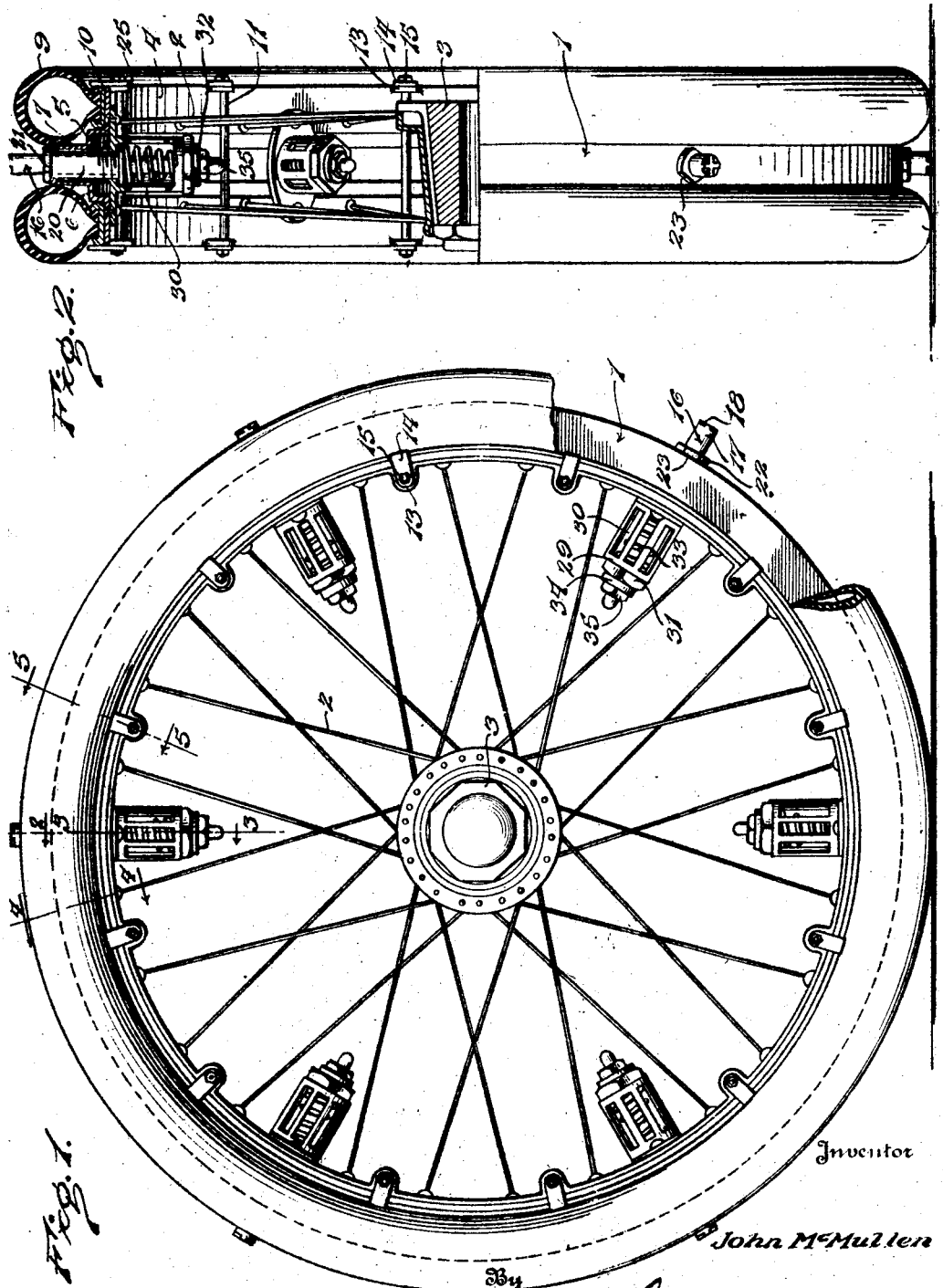

J. McMULLEN 1,556,290

NONSKID VEHICLE WHEEL

Filed Jan. 30, 1924   2 Sheets-Sheet 2

Inventor
John McMullen
By
Lacey & Lacey, Attorneys

Patented Oct. 6, 1925.

1,556,290

UNITED STATES PATENT OFFICE.

JOHN McMULLEN, OF BUTTE, MONTANA.

NONSKID VEHICLE WHEEL.

Application filed January 30, 1924. Serial No. 689,452.

*To all whom it may concern:*

Be it known that I, JOHN McMULLEN, a citizen of the United States, residing at Butte, in the county of Silver Bow and State of Montana, have invented certain new and useful Improvements in Nonskid Vehicle Wheels, of which the following is a specification.

This invention relates to improvements in vehicle wheels and while the embodiment thereof herein disclosed is designed more especially for employment on double tired wheels for use on trucks, the invention may equally as well find embodiment in other types of wheels and whether of the pneumatic or solid tire type, and regardless of character of the tire if it is of the solid type, that is to say whether of rubber or metal.

The primary object of the invention is to provide in connection with a wheel of this type, means for increasing the tractive force of the rotating wheel and at the same time preventing spinning or skidding of the wheel on muddy or slippery road surfaces.

Another object of the invention is to so construct the same that the road engaging members which serve the purpose above outlined, will not interfere with smooth running of the wheel and will not be subject to disarrangement of their parts.

Another object of the invention is to devise an extremely simple and inexpensive device for the purposes outlined which may be readily repaired if occasion requires and without the necessity of dismounting the entire wheel or dismounting either of the tires thereof.

In the accompanying drawings:

Figure 1 is a view in side elevation of a wheel constructed in accordance with the present invention, a portion of one of the tires of the wheel being broken away to better illustrate the structure;

Figure 2 is a view partly in front elevation and partly in vertical diametric section illustrating the wheel;

Figure 4:
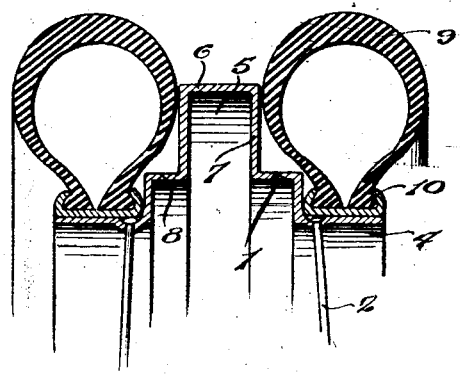
Figure 4 is a similar view taken substantially on the line 4—4 of Figure 1 looking in the direction indicated by the arrows.
Figure 5:
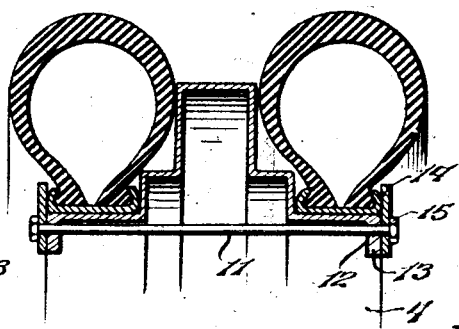
Figure 5 is a similar view on the line 5—5 of Figure 1 looking in the direction indicated by the arrows.

In the drawings, the wheel felly is indicated in general by the numeral 1, the spokes, by the numeral 2, and the hub by the numeral 3. The hub and spokes may be of any desired type as they constitute no part of the present invention, and while a specific construction of felly is herein illustrated and described, the construction may be modified within the scope of the claims. Preferably the felly 1 comprises an annular integral cast or sheet metal body having laterally disposed circumferential tire rim supporting shoulders indicated by the numeral 4 and a circumferential arched intermediate portion 5 which lies between the shoulders and comprises an outer cylindrical portion 6, side portions 7, and laterally disposed shoulder portions 8 located at the inner peripheries of the side portions 7 and extending circumferentially between the said side portions and the shoulders 4. The felly 1 may be spun, pressed, cast, or otherwise formed, and due to its peculiar formation, it will possess a maximum degree of strength. The spokes 2 which extend between the hub 3 and the felly 1, may be secured at their outer ends to the felly in any suitable manner. If the spokes are of wire, as illustrated in the drawings, then it will probably be found advisable to secure the outer ends of the spokes in the shoulders 4 of the felly as illustrated in Figure 4 of the drawings. At their inner ends they will be connected in the usual manner to the flanges of the hub.

The wheel illustrated in the drawings is of the pneumatic tired type and the pneumatic tires are indicated by the numeral 9 and are of the ordinary form and mounted upon rims indicated by the numeral 10, these rims being fitted onto the shoulders 4 of the felly 1 so that the tire casings will occupy positions at opposite sides of the intermediate portion 5 of the body of the felly. Rods 11 are disposed, at intervals in the circumference of the felly, to extend transversely of the inner side thereof and through openings 12 formed in lugs 13 upon the shoulders 4 at the outer edges of the shoulders. Rim retaining lugs 14 are fitted onto the ends of the rod 11, and nuts 15 are likewise fitted onto the said ends of the rods and are adapted to be tightened to hold the rim retaining lugs 14 in place and in firm engagement with the respective tire rim 10, the rims being in this manner removably secured upon the said shoulders 4.

Figure 3:
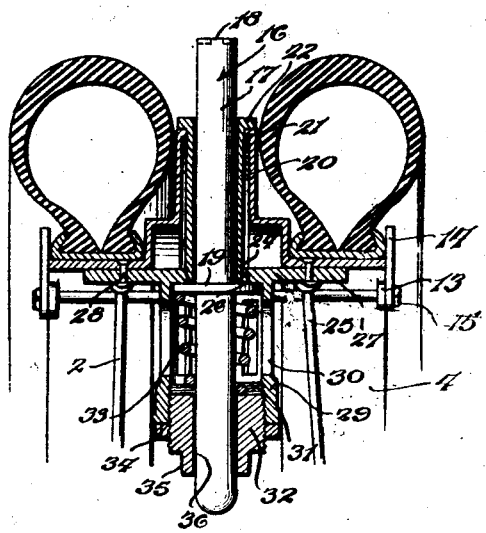
Figure 3 is a detail sectional view taken substantially on the line 3—3 of Figure 1.
Figure 6:
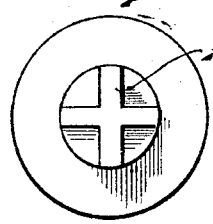
Figure 6 is an outer end elevation of one of the road engaging members of the wheel.

The non-skid device embodying the invention comprises a ground-engaging member which is indicated in general by the numeral 16 and which consists of a preferably cylindrical rod 17 which is formed at its outer end with raised portions, depressions, or otherwise, to provide a roughened ground-engaging surface, the rod in the illustrated embodiment of the invention and as most clearly shown in Figure 6 being in this instance provided with a cruciform boss 18 upon its extremity. For a purpose to be presently explained, the rod 17 is formed or provided, between its ends, with a collar or shoulder indicated by the numeral 19. The numeral 20 indicates a sleeve which is fitted at its outer end portion through an opening 21 formed in the connecting portion 6 of the intermediate portion 5 of the felly 1 and is provided with an enlargement of a form to adapt it for the application of a wrench thereto. In the present instance the enlargement is in the nature of a flange 22 which has its opposite side portions cut away on a straight line as at 23 for the purpose stated. The opposite end of the sleeve 20 is exteriorly threaded as indicated by the numeral 24 and the bore of the sleeve is of a diameter to slidably receive the rod 17. The numeral 25 indicates a base member having a threaded opening 26 into which the inner end of the sleeve is adapted to be fitted by the application of a wrench or other tool to the enlargement 22, the sleeve 20 being tightened until the flange 22 engages against the outer side of the connecting portion 6 of the body 5 of the felly. The base member 25 is provided with laterally extending lugs or ears 27, and these ears are riveted, as at 28, to the shoulders 4 as best shown in Figure 3 of the drawings. The base member 25 supports a cage which is indicated in general by the numeral 29, and this cage is of general cylindrical form and is provided in its circumference with a circumferential series of longitudinally extending slots 30 which permit of dislodgement of any dirt, mud, or other matter which might tend to otherwise accumulate within the cage. At its outer end, the cage is interiorly threaded, as at 31, and a bushing 32 is adjustably threaded into this portion of the cage and constitutes an abutment for one end of a coil spring 33 which spring at its other end bears against the collar 19 upon the rod 17, the pressure exerted by the spring serving to normally hold the rod 17 shifted in an outward direction with the collar 19 abutting the inner end of the cage 29. A lock nut 34 is threaded onto the bushing 32 and may be tightened to bind against the end of the cage 29 so as to hold the bushing 32 in positions of adjustment, it being understood that the bushing is made adjustable to vary the tension of the spring 33.

The outer end of the bushing 32 is provided with a reduced polygonal portion 35 for the application of a wrench for the purpose of adjustment. The bushing has a bore 36 in which the inner end of the rod 17 is slidably received and it will be evident that the rod is therefore guided not only at its outer end but also at its inner end and is thereby stabilized and mounted in such a manner as to permit of greater freedom of sliding movement and with less likelihood of binding. The outer extremity of the rod 17 is located slightly beyond the peripheries of the tire casings 9 so that the ground engaging members 16 project at their engaging ends somewhat beyond the peripheries of the said tires and are thereby designed to successively engage the ground surface as the wheel passes thereover.

It will be understood that while there is little likelihood of the ground-engaging members 16 becoming damaged, nevertheless if repairs or replacement should be required, any one of the members may be removed by first removing the bushing 32, then the spring 33, and finally the member itself, the operation being reversed in replacing the member or supplying a new one.

Having thus described the invention, what is claimed as new is:

1. In a wheel, a felly having an annular tire supporting shoulder, a cage supported by the felly and laterally displaced with relation to the shoulder, a guide in alinement with the cage and likewise supported by the felly, a ground-engaging member having sliding bearing in the guide and cage and having a ground engaging end presented beyond the guide and a shoulder located within the cage, and a spring within the cage bearing against the shoulder of the ground engaging member and yieldably holding the said member projected.

2. In a wheel, a felly having an annular tire supporting shoulder, a cage supported by the felly and laterally displaced with relation to the shoulder, a guide in alinement with the cage and likewise supported by the felly, a ground-engaging member having sliding bearing in the guide and cage and having a ground-engaging end presented beyond the guide and a shoulder located within the cage, a spring within the cage bearing against the shoulder of the ground engaging member and yieldably holding the said member projected, and means adjustable to vary the tension of the said spring.

3. In a wheel, a felly having an annular tire supporting shoulder, a cage supported by the felly and laterally displaced with relation to the shoulder, a guide in alinement with the cage, a bushing adjustably threaded into the cage, a ground-engaging member having sliding bearing in the guide and in the bore of the bushing and having a ground-engaging end presented beyond the guide, and a spring within the cage coacting with the said ground-engaging member and yieldably holding the said member projected.

4. In a wheel, a felly having annular tire supporting shoulders and an intermediate portion extending circumferentially between the shoulders, a cage mounted upon the felly at the inner side thereof, a sleeve mounted in the said intermediate portion of the felly, a bushing in the cage in alinement with the sleeve, a ground-engaging member slidably mounted in the sleeve and bushing, the said ground-engaging member having an abutment between its ends, and a spring surrounding the ground engaging member and located within the casing and bearing at one end against the said abutment and at its other end bearing against the bushing.

5. In a wheel, a felly having annular laterally disposed tire supporting shoulders, the said felly further comprising an annular housing, a sleeve fitted through the housing, a base secured to the inner sides of the tire supporting shoulders and spanning the space between the same, the said base having a opening and the sleeve being threaded to fit within the opening, a cage supported by the base, the cage at its inwardly presented end being interiorly threaded, a bushing adjustably threaded into the said end of the cage and having its bore in axial alinement with the said sleeve, a ground-engaging member comprising a rod slidably fitted in the bore of the sleeve and in the bore of the bushing and guided thereby at its respective opposite end portion, the said rod having an abutment thereon within the cage, and a sleeve disposed about the rod within the cage and bearing at one end against the abutment and at its other end against the said bushing.

In testimony whereof I affix my signature.

JOHN McMULLEN. [L. S.]